(12) United States Patent
Kim

(10) Patent No.: US 7,497,798 B2
(45) Date of Patent: Mar. 3, 2009

(54) HYBRID POWER TRAIN STRUCTURE USING TOROIDAL VARIATOR

(75) Inventor: Yeon-Ho Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 324 days.

(21) Appl. No.: 11/606,197

(22) Filed: Nov. 28, 2006

(65) Prior Publication Data

US 2008/0076615 A1    Mar. 27, 2008

(30) Foreign Application Priority Data

Sep. 21, 2006    (KR) .................... 10-2006-0091800

(51) Int. Cl.
*F16H 37/06*    (2006.01)

(52) U.S. Cl. .................... 475/5; 475/207; 475/216; 475/217; 477/3; 477/4; 477/5

(58) Field of Classification Search .................... 475/5, 475/207, 208, 209, 214, 215, 216, 217; 477/3, 477/4, 5, 6; 180/65.2, 65.3, 65.4, 65.6, 65.7
See application file for complete search history.

(56) References Cited

U.S. PATENT DOCUMENTS

| 6,053,842 | A  | * | 4/2000  | Kitada et al.   | 477/5   |
| 6,656,083 | B2 | * | 12/2003 | Esaki           | 477/5   |
| 7,238,139 | B2 | * | 7/2007  | Roethler et al. | 475/216 |

* cited by examiner

*Primary Examiner*—David D. Le
(74) *Attorney, Agent, or Firm*—Morgan Lewis & Bockius LLP

(57) ABSTRACT

A hybird power train structure having a toroidal variator. The hybird power train structure is constructed such that drive force generated by an engine and drive force generated by a motor are appropriately combined and transmitted to a drive wheel, thus having a quiet variable speed change characteristic despite having a relatively simple structure.

6 Claims, 1 Drawing Sheet

HYBRID POWER TRAIN STRUCTURE USING TOROIDAL VARIATOR

CROSS-REFERENCE TO RELATED APPLICATIONS

The present application is based on, and claims priority from, Korean Application Serial Number 10-2006-0091800, filed on Sep. 21, 2006, the disclosure of which is hereby incorporated by reference herein in its entirety.

FIELD OF THE INVENTION

The present invention relates to power train structures for hybrid vehicles and, more particularly, to a hybrid power train structure using a toroidal variator.

BACKGROUND OF THE INVENTION

As well known to those skilled in the art, in a toroidal variator, an input disk and an output disk are disposed to form a ring shape having a groove therebetween, and a plurality of power rollers is provided between the input disk and the output disk and couples them to each other such that power is transmitted by friction.

The toroidal variator has a relatively simple structure and is very quiet during operation thanks to reduced vibration and noise. Therefore, in the case where such a toroidal variator is used for a power train of a vehicle, the power train can quietly conduct a variable speed change operation despite having a relatively simple structure.

SUMMARY OF THE INVENTION

Embodiments of the present invention provide a hybrid power train structure having a toroidal variator which is constructed such that drive force generated in an engine and drive force generated in a motor are appropriately combined and transmitted to a drive wheel, thus quietly conducting variable speed change operation despite having a relatively simple structure.

A hybrid power train structure according to an exemplary embodiment of the present invention includes an engine and a generator coupled to the engine. A toroidal variator is provided with an input disk and an output disk that have a rotating shaft separated from an output shaft of the engine. A motor is coupled to the input disk of the toroidal variator. A planetary gear set is constructed such that elements thereof are coupled to the output disk of the toroidal variator, the engine and a differential. A brake holds a ring gear of the planetary gear set. A clutch controls power transmission between the output disk of the toroidal variator and the planetary gear set.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
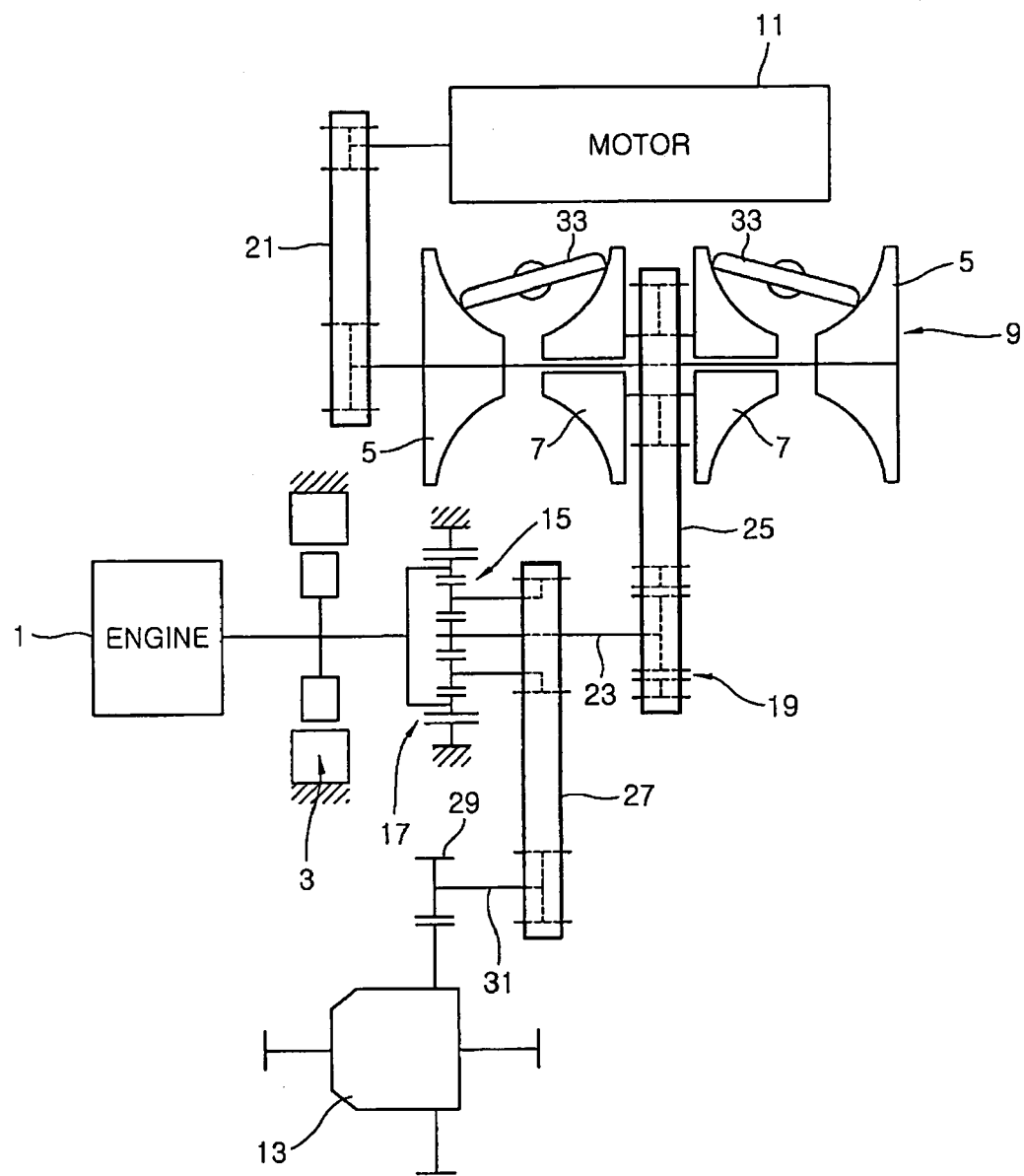
FIG. 1 is a schematic diagram illustrating a hybrid power train structure using a toroidal variator, according to an embodiment of the present invention.

Hereinafter, exemplary embodiments of the present invention will be described in detail with reference to the attached drawings.

Referring to FIG. 1, an embodiment of the present invention includes an engine 1, a generator 3 coupled to the engine 1, and a toroidal variator 9, which has an input disk 5 and an output disk 7 that have a rotating shaft separated from the output shaft of the engine 1. The embodiment further includes a motor 11, which is coupled to the input disk 5 of the toroidal variator 9, a planetary gear set 15, elements of which are coupled to the output disk 7 of the toroidal variator 9, the engine 9 and a differential 13, a brake 17 which holds a ring gear of the planetary gear set 15, and a clutch 19 which controls power between the output disk 7 of the toroidal variator 9 and the planetary gear set 15.

Furthermore, a rotating shaft of the motor 11 and the rotating shaft of the toroidal variator 9 are parallel with each other and are coupled to each other through a first chain 21. An intermediate shaft 23, which is parallel with the rotating shaft of the toroidal variator 9, is coupled to a sun gear of the planetary gear set 15. The intermediate shaft 23 is coupled to the output disk 7 of the toroidal variator 9 through the clutch 19 and the second chain 25. The engine 1 is coupled to the ring gear of the planetary gear set 15. A carrier of the planetary gear set 15 is coupled to the differential 13 through a third chain 27. Chains 21, 25, and 27 may be chain drive type arrangements, such as roller chains with associated sprockets.

The intermediate shaft 23 is coaxial with the output shaft of the engine 1. The clutch 19 is provided on the intermediate shaft 23. The clutch 19 selectively couples or decouples the intermediate shaft 23 to or from the output disk 7 of the toroidal variator 9 through the second chain 25.

A longitudinal reduction shaft 31 provided with a longitudinal reduction gear 29 is provided between the differential 13 and the third chain 27, so that rotating force is transmitted from the carrier of the planetary gear set 15 to the differential 13 through the third chain 27. Furthermore, a speed is finally reduced by the longitudinal reduction gear 29 and a ring gear of the differential 13.

The operation of an exemplary embodiment will be described herein below.

In an electric vehicle mode, in which the vehicle is moved only by the drive force of the motor 11, rotating force generated from the motor 11 is transmitted to the output disk 5 of the toroidal variator 9 through the first chain 21.

In the toroidal variator 9, rotating force, which is obtained by the operation of power rollers 33 and has appropriate rotating speed and torque, is output to the output disk 7. This rotating force is transmitted to the sun gear of the planetary gear set 15 through the intermediate shaft 23.

At this time, the engine 1 is in a stopped state due to its own frictional force, so that the ring gear of the planetary gear set 15 provides reaction force in a stopped state. Therefore, the rotating force transmitted to the sun gear is output to the carrier at a reduced speed. This rotating force is transmitted to a drive wheel through the third chain 27, the longitudinal reduction shaft 31 and the differential 13. During the above operation, if the brake 17 is operated, the ring gear of the planetary gear set 15 can reliably maintain the stopped state.

To start the engine 1, rotating force required to start the engine 1 is supplied to the engine 1 by the generator 3 coupled to the engine 1.

In a hybrid vehicle mode, in which the vehicle is moved by drive force generated from both the engine 1 and the motor 11, the speed of the vehicle is determined by controlling the engine 1 and the motor 11 and is variably controlled through the toroidal variator 9.

Drive force generated from the engine 1 is transmitted to the ring gear of the planetary gear set 15, while drive force generated from the motor 11 is transmitted to the sun gear of the planetary gear set 15 after being reduced in speed through the toroidal variator 9. The rotating force of the carrier is determined by the drive force transmitted through the above-mentioned processes and is transmitted to the differential 13 through the third chain 27. Therefore, wide and precise variable speed control of the vehicle can be realized by controlling the engine 1, the motor 11 and the toroidal variator 9.

To regenerate drive force, the ring gear is held by the brake 17 such that the rotating force supplied through the carrier is transmitted to the motor 11 through the sun gear, thereby the motor 11 generates electricity. Here, the amount of electricity generated by the motor 11 can be adjusted by appropriately controlling the toroidal variator 9. If danger results from overcharging of the battery, the clutch 19 is disengaged such that no rotating force is supplied to the motor 11. The generator 3, which is directly coupled to the engine 1, serves to generate electricity when the engine 1 is operated and to generate torque required to start the engine 1 when the engine 1 is started.

As is apparent from the foregoing, the present invention provides a power train structure for hybrid vehicles which has a toroidal variator and is constructed such that drive force generated from an engine and drive force generated from a motor are appropriately combined and transmitted to a drive wheel, thus having a quiet variable speed change characteristic despite having a relatively simple structure.

What is claimed is:

1. A hybrid power train structure, comprising:
   an engine;
   a generator coupled to the engine;
   a toroidal variator provided with an input disk and an output disk that have a rotating shaft separated from an output shaft of the engine;
   a motor coupled to the input disk of the toroidal variator;
   a planetary gear set uavining elements separately coupled to the output disk of the toroidal variator, the engine and a differential respectively;
   a brake to hold a ring gear of the planetary gear set; and
   a clutch to control power transmission between the output disk of the toroidal variator and the planetary gear set.

2. The hybrid power train structure as defined in claim 1, wherein:
   a rotating shaft of the motor and the rotating shaft of the toroidal variator are parallel with each other and are coupled to each other;
   an intermediate shaft, which is parallel with the rotating shaft of the toroidal variator, is coupled to a sun gear of the planetary gear set;
   the intermediate shaft is coupled to the output disk of the toroidal variator;
   the engine is coupled to the ring gear of the planetary gear set; and
   a carrier of the planetary gear set is coupled to the differential.

3. The hybrid power train structure as defined in claim 2, wherein said motor rotating shaft and said variator rotating shaft are coupled through a first chain.

4. The hybrid power train structure as defined in claim 2, wherein said intermediate shaft is further coupled to said output disk through the clutch and a second chain.

5. The hybrid power train structure as defined in claim 2, wherein said carrier is coupled to the differential through a third chain.

6. The hybrid power train structure as defined in claim 5, wherein a longitudinal reduction shaft having a longitudinal reduction gear is provided between the differential and the third chain.

* * * * *